Feb. 21, 1950 H. J. LIPKIN 2,498,561

ADJUSTABLE BAND-PASS SELECTOR

Filed Sept. 6, 1945

*INVENTOR.*

HARRY J. LIPKIN

*BY* William D. Hall

ATTORNEY

UNITED STATES PATENT OFFICE 2,498,561

ADJUSTABLE BAND-PASS SELECTOR

Harry J. Lipkin, Dorchester, Mass., assignor, by mesne assignments, to the United States of America as represented by the Secretary of War Application September 6, 1945, Serial No. 614,728

4 Claims. (Cl. 179—171)

This invention relates generally to an electrical circuit and more particularly to an electrical band switching circuit.

In a receiver designed to detect pulses of radio frequency energy the quality of reproduction for a pulse of a specified duration depends upon the bandwidth of the receiver. The overall bandwidth of a receiver may be defined as the band of frequencies which are amplified to a usable amplitude in the receiver output. The bandwidth is determined by a compromise between having a steep leading edge of the output pulses, which requires a wide bandwidth, and obtaining a high signal-to-noise (S/N) ratio which requires a narrow bandwidth.

A definition of the S/N ratio is the R. M. S. value of the signal to the R. M. S. value of the noise signal in the receiver output.

Noise signals originate for the most part in the receiver itself as small, random, unpredictable fluctuations of a voltage or current. The wider the bandwidth, the greater is the amount of noise in the receiver output. Noise signals interfere with the normal reception of desirable pulses in the receiver.

A square pulse may be considered to be made up of a plurality of frequency components, the number of which depends upon the width of the pulse. The narrower the pulse, the greater is the number of frequency components that will be contained and consequently the wider must be the bandwidth to faithfully reproduce the pulse. If the bandwidth of the amplifier is such that some of the frequencies present in the input pulse are not amplified, then the pulse will be changed in shape in going through the amplifier.

In search type radio object locating systems where detection of a reflecting object is the primary importance, the shape of the receiver output pulse is of little importance as long as it is reproduced to a usable magnitude.

In a radio object locating system where accurate range data is of primary consideration, it is important to preserve the shape of the pulse, especially the leading edge. In general, for a rectangular input pulse of a particular dimension, the slope of the steepest part of the output pulse is directly proportional to the overall receiver bandwidth. Usually the bandwidth in a range system is greater than in a search system because the steepness of the leading edge of the pulse is important for accurate range measurement.

One object of this invention is to provide electrical bandwidth switching in a radio frequency receiver.

Another object is to provide bandwidth switching and at the same time allow the gain to change in accordance with the change in the S/N ratio.

A further object is to prevent said switching means from affecting the tuning of the resonant circuits of the receiver.

Figure 1:
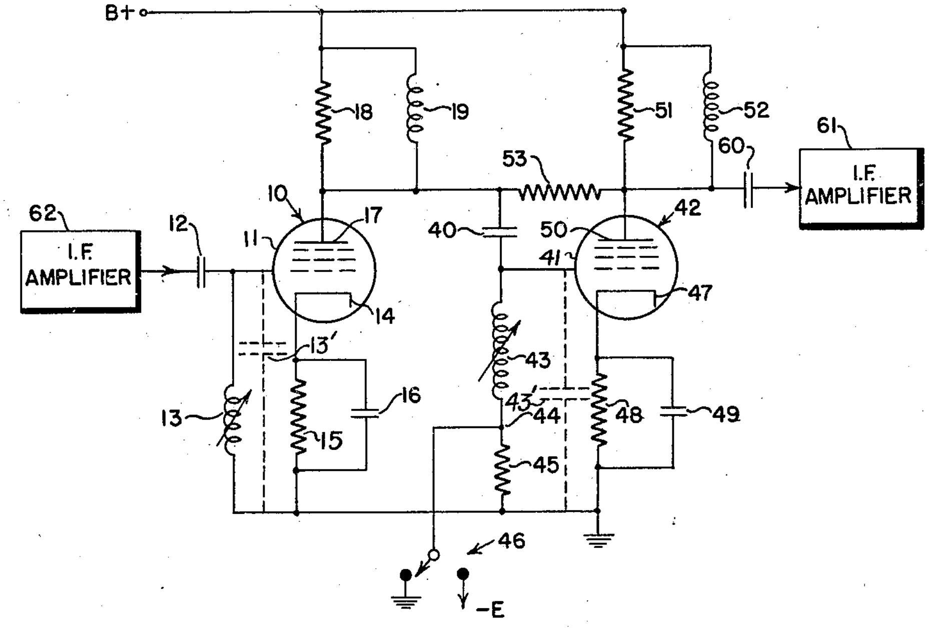
Figures 2, 3:
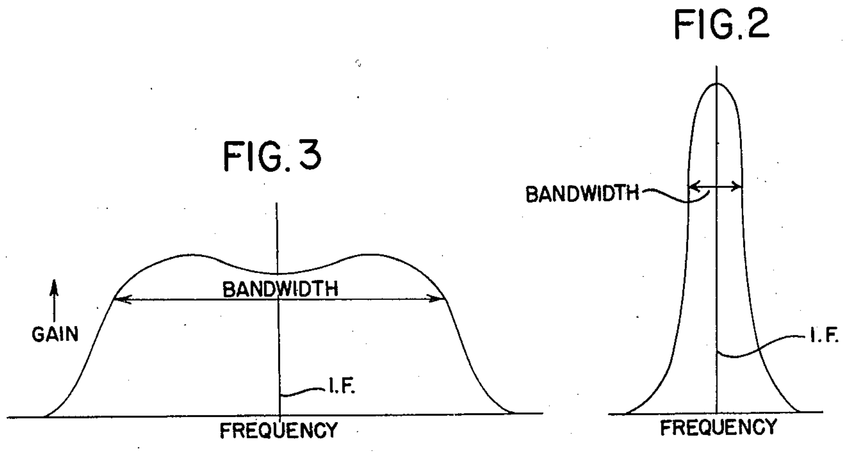

Other objects, features and advantages of this invention will suggest themselves to those skilled in the art and will become apparent from the following description of the invention taken in connection with the accompanying drawings in which:

Fig. 1 shows a schematic diagram of a circuit embodying the principles of this invention; and Figs. 2 and 3 show curves to be used in the description of the operation of this invention.

Referring more specifically to Fig. 1 there is shown a portion of the intermediate frequency (I.-F.) channel in a superheterodyne type radio receiver. This portion of the I.-F. channel includes I.-F. amplifier tube 10 whose control grid 11 is coupled through coupling capacitor 12 to a previous intermediate frequency stage 62 of the receiver channel. Control grid 11 is also returned to ground through variable tuning inductance 13. Capacitor 13′ represents the wiring capacitances in the grid circuit of tube 10. Cathode 14 is connected to ground through a bias resistor, 15, which is connected in parallel with a by-pass capacitor 16. Anode 17 is returned to a suitable positive potential B+ through load resistor 18 which is shunted by choke 19.

Anode 17 is coupled through coupling capacitor 40 to control grid 41 of switch tube 42. Control grid 41 is returned to ground through variable tuning inductance 43, terminal 44, and resistor 45. Terminal 44 may be grounded or connected to a negative potential, —E, dependent upon the position of the switch 46. Cathode 47 is connected to ground through a bias resistor, 48, which is connected in parallel with by-pass condenser 49. Anode 50 of switch tube 42 is returned to a suitable positive potential B+ through a load resistor, 51, which is shunted by choke 52. Anode 50 is connected through feedback resistor 53 and coupling capacitor 40 to control grid 41 of switch tube 42. Anode 50 is also coupled through coupling capacitor 60 to a following stage, 61, of the receiver channel. Stage 61 may be an I.-F. stage of conventional design. Amplifier tube 10 and switch tube 42 may be of the pentode type, and for simplicity of explanation and drawing, their screen grids and suppressor grids have not been shown connected into the circuit.

Variable inductance 43 together with the wiring capacitances in the grid circuit of switch tube 42 forms a parallel resonant circuit which may be tuned to the intermediate frequency in the receiver channel. Tuning inductance 13 performs a similar function for control grid 11 of I.-F. amplifier 10.

In briefly explaining the operation of this invention, switch tube 42 functions substantially as an electrical bandwidth control for the I.-F. amplifier channel shown in Fig. 1. When a negative voltage sufficient to cut switch tube 42 off is applied to terminal 44, the two I.-F. amplifiers 10 and 62 function normally as narrow bandwidth, high-gain stages. With terminal 44 grounded, the overall bandwidth is widened with a consequent decrease in the S/N ratio.

For a detailed description of this invention, reference will now be made to Fig. 1 and also to Figs. 2 and 3 where the above described amplifier characteristics are shown. In an amplifier, the gain, which is a ratio of the output signal voltage level to the input signal voltage level, is directly proportional to the A.-C. impedance to radio frequency in the anode circuit. In addition, the bandwidth of the amplifier is inversely proportional to the A.-C. impedance to radio frequencies in the anode circuit. By placing the grid 41 of switch tube 42 at a suitable negative potential, switch tube 42 is cut off and a substantially high A.-C. impedance is presented to the anode of amplifier 10. The overall gain of the circuit is high and the bandwidth is narrow. The amplifier characteristic (gain vs. frequency) indicating this condition is shown by the curve of Fig. 2. In Fig. 2, the receiver bandwidth includes the band of frequencies between the points of .707 of the maximum gain. Maximum gain is centered about the intermediate frequency of the receiver channel.

However, when terminal 44 is grounded, the grid bias voltage of switch tube 42 is removed and the stage will conduct. Feedback resistor 53 and coupling capacitor 40 provides a degenerative feedback path from the plate to grid of switch tube 42. In degenerative feedback the polarity of the voltage fed from the anode back to the grid is such as to cancel or diminish the effective signal input to the grid. This stage, in conducting, will now present a substantially low A.-C. impedance to the anode of the amplifier 10. Hence, the overall bandwidth will be widened and the overall gain will diminish. The amplifier characteristic indicating this condition (gain vs. frequency) is shown by the curve in Fig. 3. It can be seen that the bandwidth has been widened by a factor of approximately 6 and the maximum gain has been diminished by about half.

With a circuit such as this it is possible to design a degenerative amplifier which will switch between two particular values of bandwidth, and at the same time allow a change in gain to compensate for the change in the S/N ratio. The above conditions may be met principally by the proper choice of resistors 18, 53, and 51 and the transconductance of switch tube 42.

Bandwidth switching is thereby achieved by changing the bias of switch tube 42 to make it conducting or nonconducting. It is evident that the magnitude of the D.-C. bias applied to stage 42 effectively controls the amount by which the bandwidth is changed. It should also be evident that the two bandwidths may be so chosen that switch tube 42 is not cut off when either bandwidth is used but is switched between two levels of conductivity by changing the bias voltage applied through the switch 46.

The radio frequency chokes have been shunted across the plate load resistors 18 and 51 of stages 10 and 42, respectively, to make the plate voltages substantially constant as the conduction current through the switch tube is changed. It is also desirable to prevent the reduction in plate potential due to the direct current flow through the stages.

In the switching arrangement shown, the switch does not lie in the I.-F. band. Hence, the distributed capacitances of the switching circuit will not detune the resonant tank circuits of the various I.-F. stages.

While there has been described hereinabove what is at present considered to be a preferred embodiment of this invention, it will be obvious to those skilled in the art that various changes and modifications may be made therein without departing from the scope of the invention as set forth in the appended claims.

What I claim is:

1. In combination, a first and a second electron discharge device each containing at least an anode, cathode, and control grid, said first electron discharge device having an output voltage level greater than a given input voltage level, a means for applying said output voltage to the control grid of said second electron discharge device, resonant circuit means associated with said first and second electron discharge devices for tuning to a predetermined frequency, a switch means associated with said second electron discharge device, said switch means having two positions and operating in one position to cause the grid of said second electron discharge device to be at ground potential and operating in the other position to cause the grid of said second electron discharge device to be at a negative potential, said negative voltage being sufficient to prevent said second electron discharge device from conducting a current, resistive and capacitive bias means for connecting the cathode of said second electron discharge device to ground potential, a resistive-capacitive means for applying a degenerative signal from the anode to the control grid of said second electron discharge device, resistive-inductive means associated with the anodes of said first and second electron discharge devices for producing a constant voltage at the anodes of said devices, a means for taking an output voltage from the anode of said second electron discharge device and ground.

2. In combination a first and a second electron discharge device each containing at least a cathode, anode, and control grid, said first electron discharge device having an output voltage level greater than a given input voltage level, a means for applying said output voltage to the control grid of said second electron discharge device, selective means associated with said second electron discharge device and having two positions and operating in one position to ground the control grid of the second electron discharge device and operating in the other position to apply a negative potential to said control grid of said second electron discharge device, a means for applying a degenerative signal from the anode to control grid of said second electron discharge device, an output voltage being taken from the anode of said second electron discharge device and ground.

3. In a radio circuit an adjustable band pass circuit comprising a first electron discharge device containing at least an anode, cathode and control grid, a parallel resonant circuit means associated with said control grid for tuning to a predetermined frequency, said first electron discharge device having an output voltage level greater than a given input voltage level, a second electron discharge device containing at least an anode, cathode and control grid, a second parallel resonant circuit means associated with said control grid of said second electron discharge device for tuning to a predetermined frequency, network means for applying a degenerative signal from the anode of said second electron device to the control grid of said second electron device, first coupling means for taking an output signal from said second electron discharge device, second coupling means connecting the anode of said first electron discharge device to the control grid of said second electron discharge device and to said first coupling means through said network, and means for controlling the degree of conduction of said second electron discharge device whereby said last mentioned means effectively controls the pass band width of said circuit.

4. A circuit as claimed in claim 3 wherein said last mentioned means comprises a switch having a movable contact thereof connected to said control grid of said second electron discharge device through said second parallel resonant circuit, said switch means having at least a first and a second stationary contact connected to a first and a second point of fixed reference potential, at least one of said points of reference potential being sufficiently negative to cause anode current cut off in said second electron discharge device.

HARRY J. LIPKIN.

REFERENCES CITED

The following references are of record in the file of this patent:

UNITED STATES PATENTS

| Number | Name | Date |
|---|---|---|
| 1,944,119 | Braden | Jan. 16, 1934 |
| 2,152,618 | Wheeler | Mar. 28, 1939 |
| 2,216,997 | Lewis | Oct. 8, 1940 |
| 2,262,707 | Farrington | Nov. 11, 1941 |